(12) United States Patent
Russell

(10) Patent No.: US 8,473,852 B2
(45) Date of Patent: Jun. 25, 2013

(54) VIRTUAL WORLD BUILDING OPERATIONS CENTER

(75) Inventor: Steven A. Russell, Princeton, NJ (US)

(73) Assignee: Siemens Corporation, Iselin, NJ (US)

( * ) Notice: Subject to any disclaimer, the term of this patent is extended or adjusted under 35 U.S.C. 154(b) by 336 days.

(21) Appl. No.: 12/844,904

(22) Filed: Jul. 28, 2010

(65) Prior Publication Data
US 2011/0029897 A1 Feb. 3, 2011

Related U.S. Application Data

(60) Provisional application No. 61/230,201, filed on Jul. 31, 2009.

(51) Int. Cl.
*G06F 3/048* (2006.01)
(52) U.S. Cl.
USPC ............................................ 715/757; 810/764
(58) Field of Classification Search
USPC .............................. 715/810, 764, 757
See application file for complete search history.

(56) References Cited

U.S. PATENT DOCUMENTS

| 8,026,918 | B1 * | 9/2011 | Murphy ........................ 345/473 |
| 2005/0289467 | A1 | 12/2005 | Imhof et al. |
| 2006/0248461 | A1 * | 11/2006 | Yamada et al. ............... 715/706 |
| 2007/0219645 | A1 * | 9/2007 | Thomas et al. ................. 700/29 |
| 2008/0282004 | A1 * | 11/2008 | Dillenberger et al. ........ 710/100 |
| 2009/0286598 | A1 * | 11/2009 | Do et al. ......................... 463/31 |
| 2010/0030804 | A1 * | 2/2010 | Behrends et al. ......... 707/103 R |

FOREIGN PATENT DOCUMENTS
WO 00/04478 A2 1/2000

OTHER PUBLICATIONS

Wayback Machine non-patent literature for Wikipedia article "The Sims", Mar. 18, 2009, titled "The Sims", pp. 1-11.*
Wayback Machine non-patent literature for Wikipedia article "The Sims", Mar. 2, 2009, titled "Maid", pp. 1-4.*
Wayback Machine non-patent literature for Wikipedia article "The Sims", Jun. 2, 2009, titled "Repairman", pp. 1-4.*
Bailey et al., "The Virtual Building", Dec. 31, 2008, pp. 15-25. Retrieved from internet: http://www.arup.com/_assets/_download/D6E07D17-19BB-316E-40DD7479AA23FA6D.pdf.
Sung et al., "The avatar navigation of distributed virtual environment by using multiview client", Computer Human Interaction, 1998, Proceedings 3rd Asia Pacific Shonan Village Center, Japan, Jul. 15-17, 1998, IEEE Comput. Soc, Jul. 15, 1998, pp. 108-113.
Brandon, "Virtual World-Building: Designing Environments for Learners", Oct. 15, 2007, pp. 1-8, retrieved from internet: http://www.learningsolutionsmag.com/articles/123/virtual-world-building-designing-environments-for-learners .
PCT Search Report dated Dec. 3, 2010.

* cited by examiner

*Primary Examiner* — Ramsey Refai
*Assistant Examiner* — Erik Stitt

(57) ABSTRACT

Methods and systems are described that allow coordinated users to employ avatars to observe and control a plurality of buildings—their building support systems and functions from a virtual world environment. Embodiments coordinate building supervisory personnel (specialists), building monitoring and control equipment, and repair (worker) personnel in a virtual world that is controlled by specialist avatars. Operations personnel perform building operation decisions in response to current situations in a virtual world using their specialist avatars.

34 Claims, 12 Drawing Sheets

VIRTUAL WORLD BUILDING OPERATIONS CENTER

CROSS REFERENCE TO RELATED APPLICATIONS

This application claims the benefit of U.S. Provisional Application No. 61/230,201, filed on Jul. 31, 2009, the disclosure which is incorporated herein by reference in its entirety.

BACKGROUND OF THE INVENTION

The invention relates generally to operational control. More specifically, the invention relates to systems and methods that allow the administration of real world buildings from within a virtual world.

Currently, in building control center operations, there is a problem with access to real-time information and coordinated control of building systems. For more than one building and their operating systems, complex screens are difficult to observe and navigate. A worker's attention is hard to maintain, appropriate maintenance and response actions are hard to coordinate and measurements of performance are difficult to assess. With increasing regulations and associated cost, building operators struggle to obtain computer systems and trained personnel that satisfy occupants and financial objectives.

Three-dimensional (3D) modeling has matured beyond hand-drawn and Virtual Reality (VR) systems, and multiple user computer games to enable remote users to select and control an avatar which is a representation or alter ego of the computer user in an immersive virtual scene with the ability to walk through, observe and manipulate objects and communicate with other avatars. Large scale virtual world systems have been used for role playing, socializing, marketing, meetings, data analytics, and limited educational and training sessions. However, operations systems are more critical and relate to economic consequences and safety, so any development, deployment, or sale of virtual world based building operation systems have been difficult.

Simulations for real-time system control that use virtual representations have indicated narrow and disconnected functionalities without commercial adoption for daily command and control. For example, test models have connected physically simple single-user systems such as a thermometer or thermostat with a virtual copy in a rudimentary building by passing a signal between the virtual world and a physically connected external system such as a digital temperature control. For single structures such as a single family home, personal computer based interfaces have been suggested as ways for a homeowner to see and partially manage a few household systems in mixtures of two-dimensional (2D) screens and a partially detailed virtual version of the house.

One example of home use is that of thermostatic temperature control. A traditional windowed virtual building display on a computer is hard to read and only allows single user input. Extending to multiple buildings and users, and different types of equipment, and information interfaces require a new scale of balanced operations with added inputs from a wider set of devices, more controls with channels linked for outbound commands, larger sets of collaborating specialists, more dynamic on-demand needs for management and worker dispatch, and more tracking for reporting on regulatory compliance, safety, cost containment and process improvement.

Among the barriers to practical use of earlier demonstrations are factors such as connectivity, breadth of devices, multi-specialty roles, interface standardisations, worker communications, knowledge presentation, teamwork support, practical avatar collaboration and ergonomics, situational clarity, safety, security, financial decision support, and regulatory compliance.

What is needed is a system and method that allows users to observe and control a plurality of building support systems and functions from a virtual world environment.

SUMMARY OF THE INVENTION

The inventor has discovered that it would be desirable to have a system and method that allows coordinated users to employ avatars to observe and control a plurality of buildings—their building support systems and functions from a virtual world environment. Embodiments coordinate building supervisory personnel (specialists), building monitoring and control equipment and repair (worker) personnel in a virtual world that is controlled by specialist avatars. Operations personnel perform building operation decisions in response to current situations in a virtual world using their specialist avatars.

One aspect of the invention provides a method for controlling and maintaining real world buildings through a virtual world environment. Aspects according to the method include creating one or more virtual buildings each corresponding with a real world building, each virtual building comprises an exterior, an interior, exterior and interior building equipment, and embedded building attributes, and creating a Virtual Building Operations Center (VBOC) to manage the one or more virtual buildings, the VBOC comprises one or more specialist avatar consoles, each specialist avatar console corresponds with a specialist avatar activity and has a virtual computing device displaying information pertaining to the specialist avatars' activity, one or more specialist avatar consoles, one or more table 3D displays, and one or more vertical displays, and interfacing each of the one or more virtual buildings with their real world building and the VBOC, creating specialist avatars and one or more worker avatars, wherein specialist avatars manage building operations according to a predefined responsibility and worker avatars mimic real world workers responsible for performing real world building equipment maintenance and repair, specialist and worker avatars have a first person or a third person Field of View (FOV), can walk or teleport to destinations, talk with other specialist or worker avatars and manipulate objects, controlling the one or more real world building operations from the VBOC, and responding to special conditions for the one or more real world buildings from the VBOC.

Another aspect of the invention is where the specialist avatars predefined responsibilities are regulatory and safety, equipment, incident, finance, worker and security.

Another aspect of the invention is where the worker avatars mimic electrical, plumbing, HVAC and security workers.

The details of one or more embodiments of the invention are set forth in the accompanying drawings and the description below. Other features, objects, and advantages of the invention will be apparent from the description and drawings, and from the claims.

DETAILED DESCRIPTION

Embodiments of the invention will be described with reference to the accompanying drawing figures wherein like numbers represent like elements throughout. Before embodiments of the invention are explained in detail, it is to be understood that the invention is not limited in its application to the details of the examples set forth in the following description or illustrated in the figures. The invention is capable of other embodiments and of being practiced or carried out in a variety of applications and in various ways. Also, it is to be understood that the phraseology and terminology used herein is for the purpose of description and should not be regarded as limiting. The use of "including," "comprising," or "having," and variations thereof herein is meant to encompass the items listed thereafter and equivalents thereof as well as additional items.

The terms "connected" and "coupled" are used broadly and encompass both direct and indirect connecting, and coupling. Further, "connected" and "coupled" are not restricted to physical or mechanical connections or couplings.

It should be noted that the invention is not limited to any particular software language described or that is implied in the figures. One of ordinary skill in the art will understand that a variety of software languages may be used for implementation of the invention. It should also be understood that some of the components and items are illustrated and described as if they were hardware elements, as is common practice within the art. However, one of ordinary skill in the art, and based on a reading of this detailed description, would understand that, in at least one embodiment, components in the method and system may be implemented in software or hardware.

Embodiments of the invention provide methods, system frameworks, and a computer-usable medium storing computer-readable instructions that create a virtual world operations center and provide data and control interfaces between the virtual world operations center and external real world building control systems. The invention may be deployed as software as an application program tangibly embodied on a program storage device. The application code for execution can reside on a plurality of different types of computer readable media known to those skilled in the art.

Figure 1:
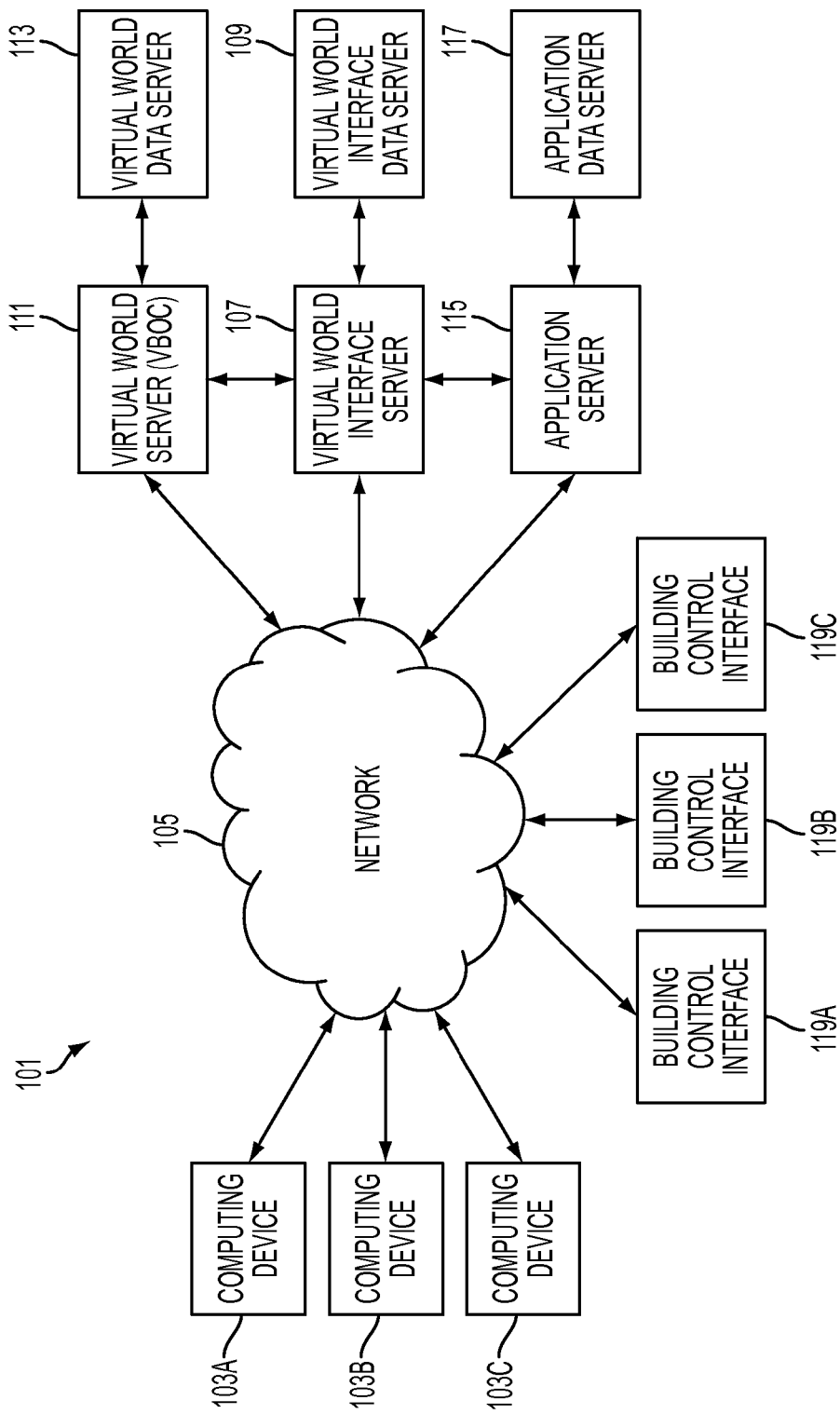
FIG. 1 is an exemplary virtual building operations center virtual world interface framework.

FIG. 1 shows a Virtual Building Operations Center (VBOC) framework 101. The framework 101 comprises one or more individual computing devices 103A, 103B, 103C (collectively 103) coupled to a network 105 such as a Local Access Network (LAN) or the Internet, a virtual world interface server 107, a virtual world interface data server 109, a virtual world server 111, a virtual world data server 113, an application server 115, an application data server 117 and one or more building control systems interfaces 119A, 119B, 119C (collectively 119). The application servers contain the software for the computer programs and the data servers manage access to the information needed by those programs, where the function of a particular data server may or may not be accomplished by the same computer hardware as the application.

The computing devices 103 allow one or more users to login to the virtual world server 107 to enter a virtual building operations center and administer and control real world building systems.

The virtual world interface server 107 recalls data used to construct the virtual operations center. The data comprises building modeled layouts for each real world building, building equipment and systems with associated control devices and building attributes rendered in a virtual domain. Attributes comprise equipment failure, building heating due to sunlight and others. The virtual world interface data server 109 acts as a repository for data that is needed for work situations in the virtual environment.

The virtual world data server 109 stores static and modified information about a virtual building scene, equipment and people being managed, and other data from external sources that may be accessed such as weather information or personnel data.

Each building control systems interface 119 provides process and control variables from a real world building. The process and control variables are provided by real world building control and data acquisition systems. Process variables and data may comprise security systems (access, presence, identity, occupancy detection, door position, and camera video and audio feeds), HVAC (Heating, Ventilation and Air Conditioning status), elevator status, water heating systems, safety systems (fire alarms, evacuation lights and alarms, and exterior and common area traffic), utility consumption (electricity, natural gas, generators and batteries) area temperature sensors, communications with management and workers and external agencies, energy generation and conservation (wind, solar and active shading), Internet and telephone connectivity, water capture and retention management, and staff check-in and assignment tracking software. The building control system interfaces 119 make building control system data available to the virtual building operations center.

The application server 115 and application data server 117 access data sources that link to the virtual world interface server 107. The data sources may include financial databases, federal or state regulatory or legal information, personnel data and others.

Figure 2:
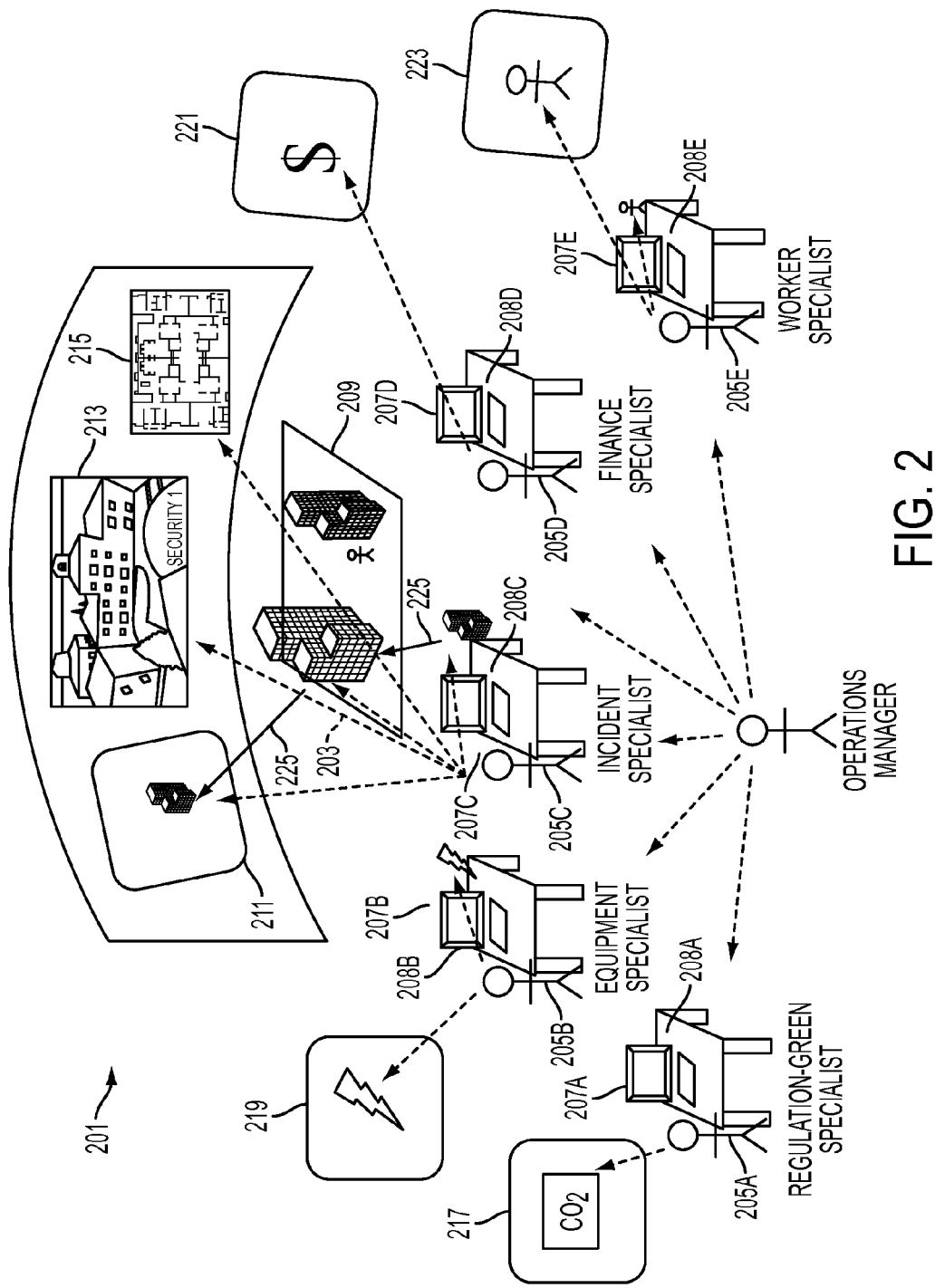
FIG. 2 is an exemplary virtual building operations center layout.
Figure 3:
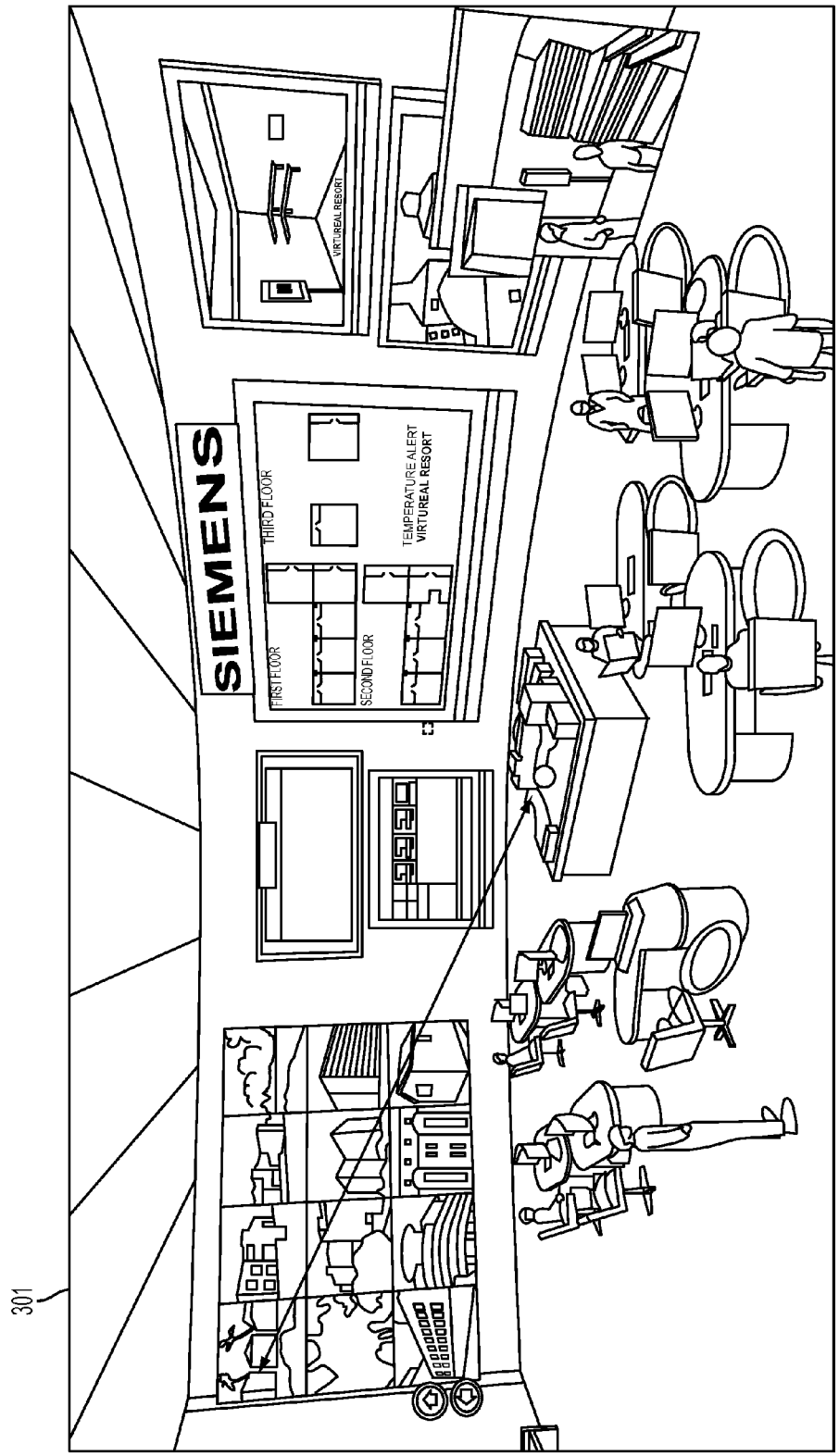
FIG. 3 is an exemplary virtual building operations center view of building specialist avatars interfacing with building operations systems, real world workers and worker avatars.
Figure 5:
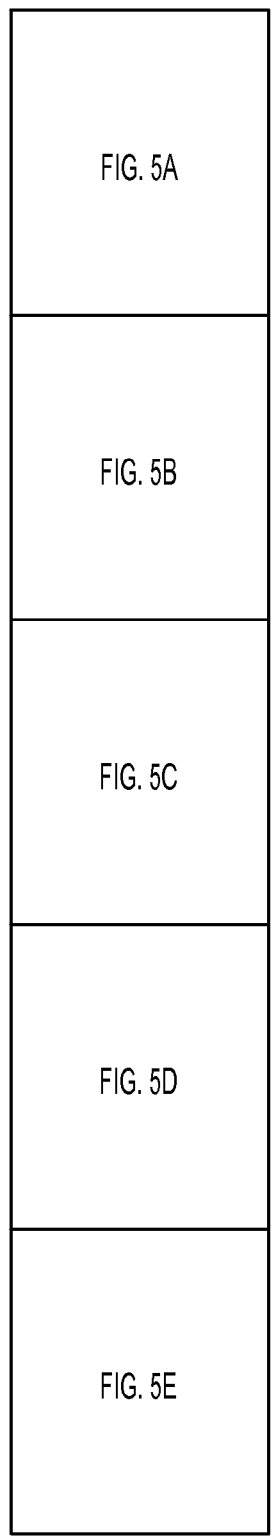
FIG. 5 is an exemplary virtual building operations center method.
Figure 5A:
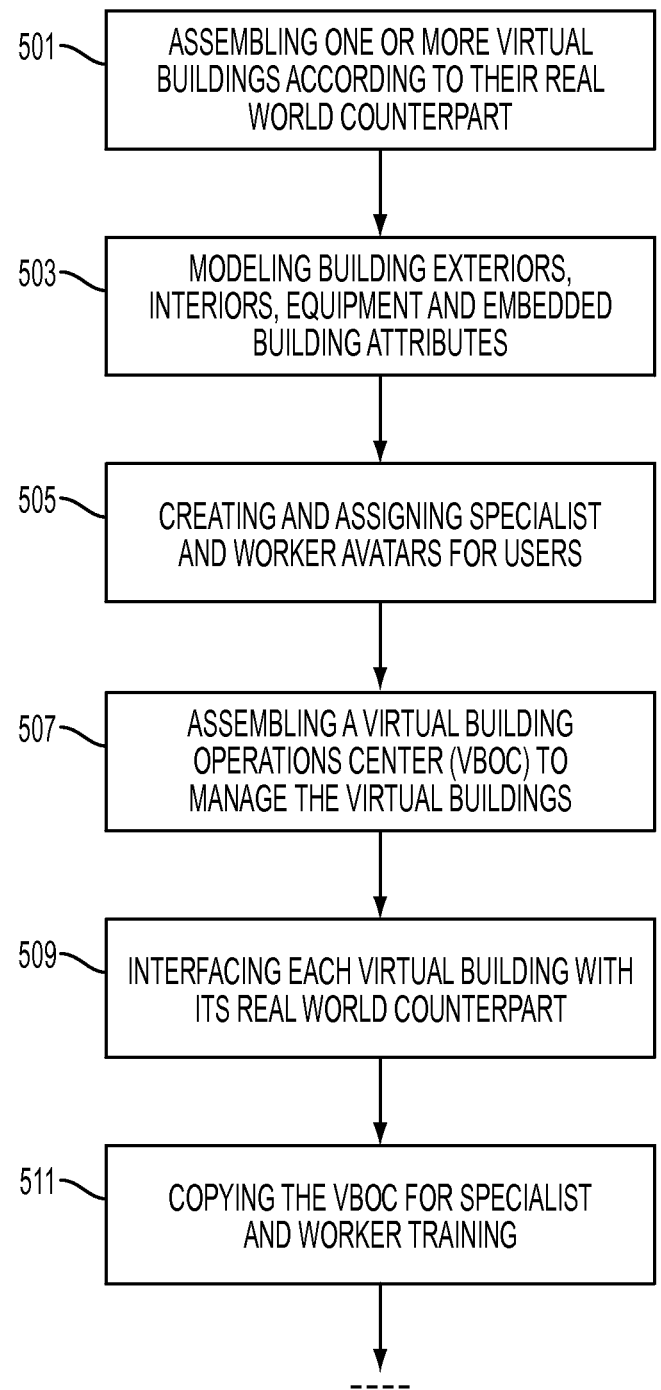
Figure 5B:
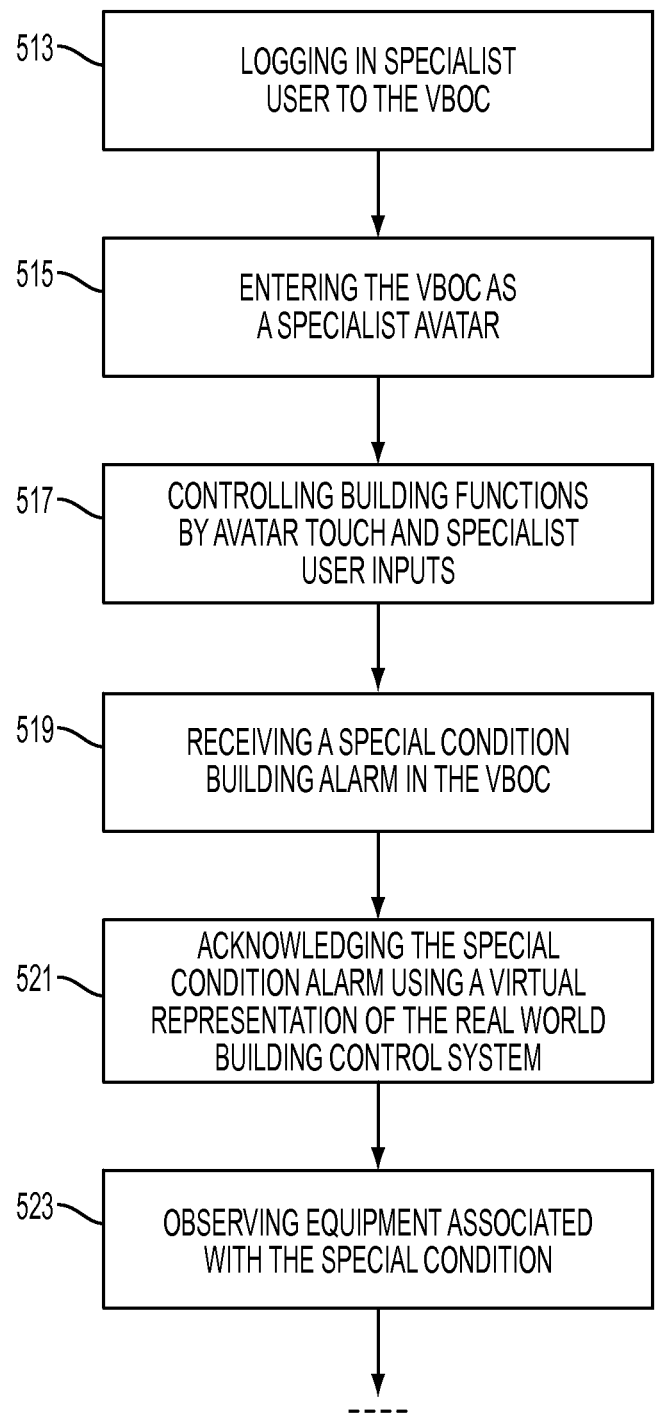
Figure 5C:
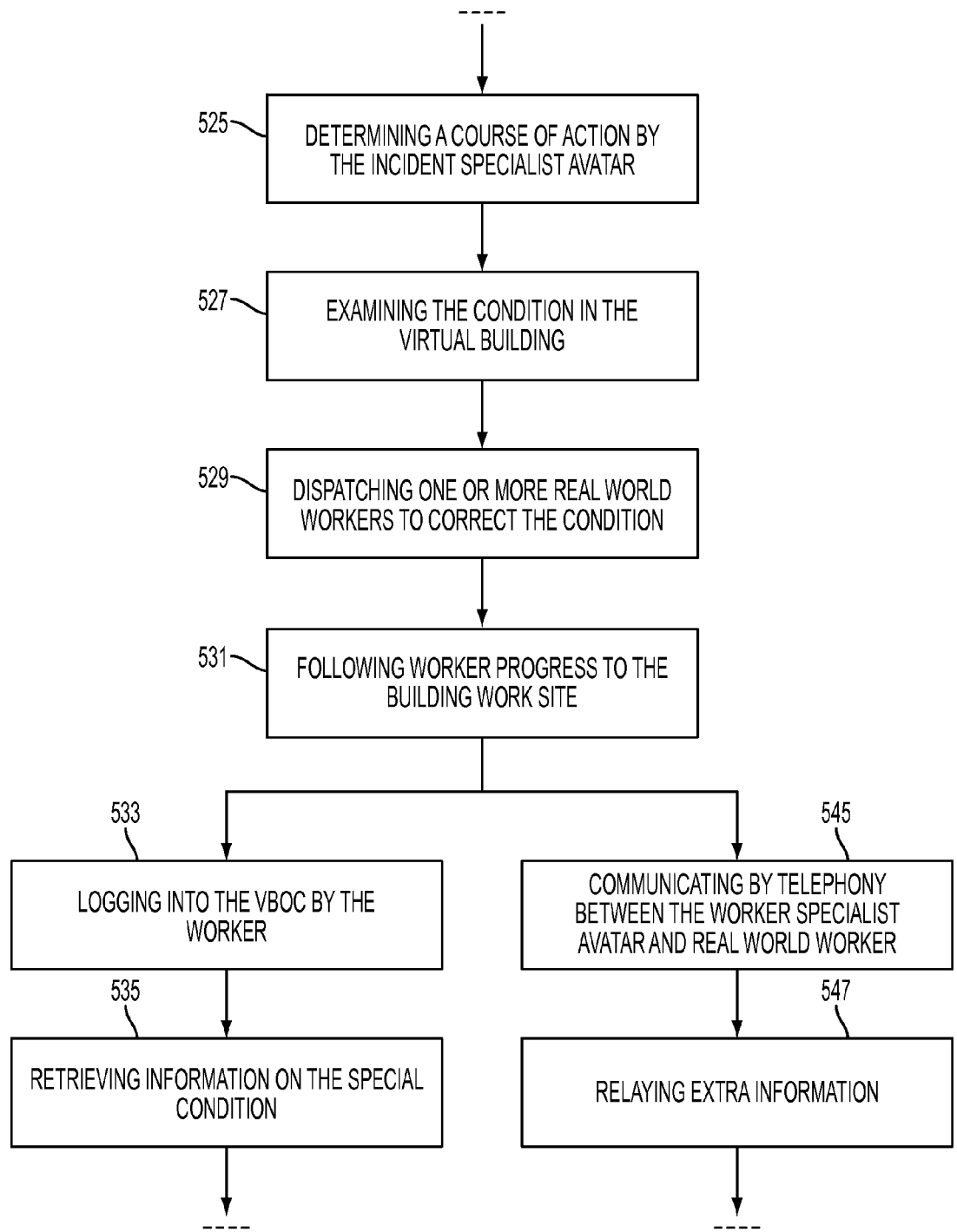
Figure 5D:
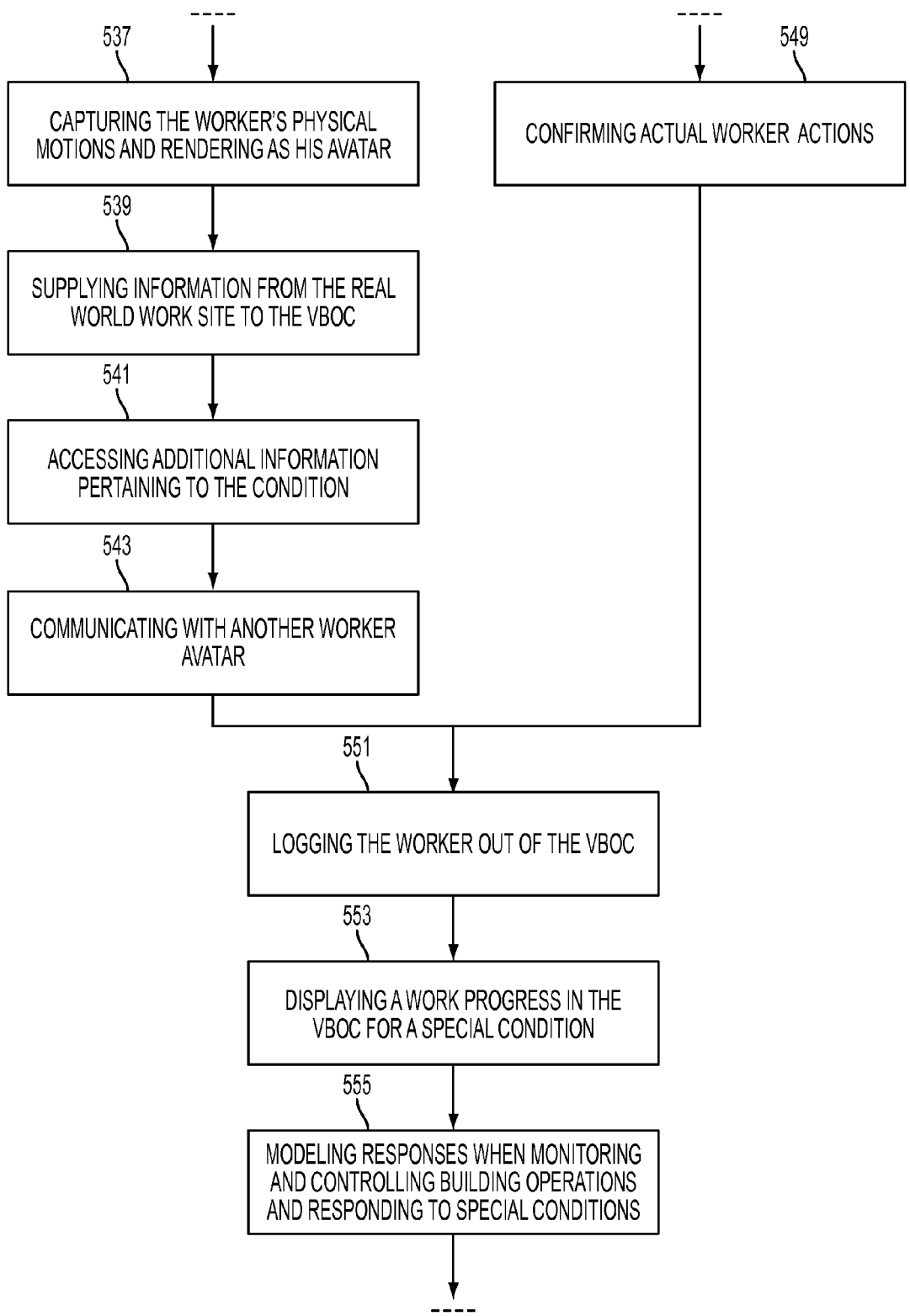
Figure 5E:
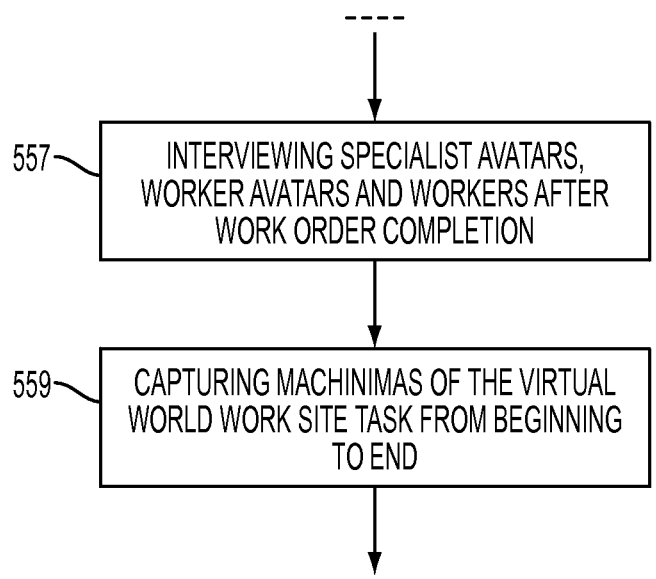

FIGS. 2 and 3 show the virtual building operations center 201, 301 constructed by the virtual world server 111 and FIG. 5 shows a method. The virtual operations center 201 controls one or more real world buildings. Each virtual world building 203 represents its physical building exterior, interior and support systems.

Embodiments construct a virtual building operations center 201 of physical systems and users that administer them. The users are building specialists and workers. The systems and data communications that connect the one or more real world building systems are accessed for use in the virtual building operations center 201. Records on the virtual world functions and activities are maintained in the virtual world interface data server 109 for operations, performance improvement and reporting.

The physical systems, buildings and structures appearing in the virtual world are models of the real world buildings the virtual building operations center 201 manages. The virtual world models are constructed by assembling representative primitives such as flat or curved surfaces and textures according to their real world counterparts (step 501).

A physical object such as a building or a piece of building equipment is replicated as a 3D representation which is displayed in a virtual world scene. A virtual world scene involves modeling real world building exteriors, interiors and support equipment using software and human graphic artists. Object attributes when being manipulated by an avatar in a virtual world scene such as text, work steps and dynamic characteristics are modeled. The degree of resolution for a given real world object in a virtual world scene varies to ease modeling and simplify recognition. Some virtual world objects may be displayed in high definition while other objects such as hand railings may not be shown.

The look of buildings monitored by the virtual building operations center 201 is similar to their real world counterparts. For example, a real world building that has ten levels is modeled as a virtual world building having ten levels. Building equipment located in interior and exterior areas of the building is modeled along with control and monitoring devices in their exact locations. Switches, alarm panels, HVAC units, air vents, circulation fan locations, pipe and cable chases, and other building features in a real building are modeled accordingly (step 503).

Figure 4:
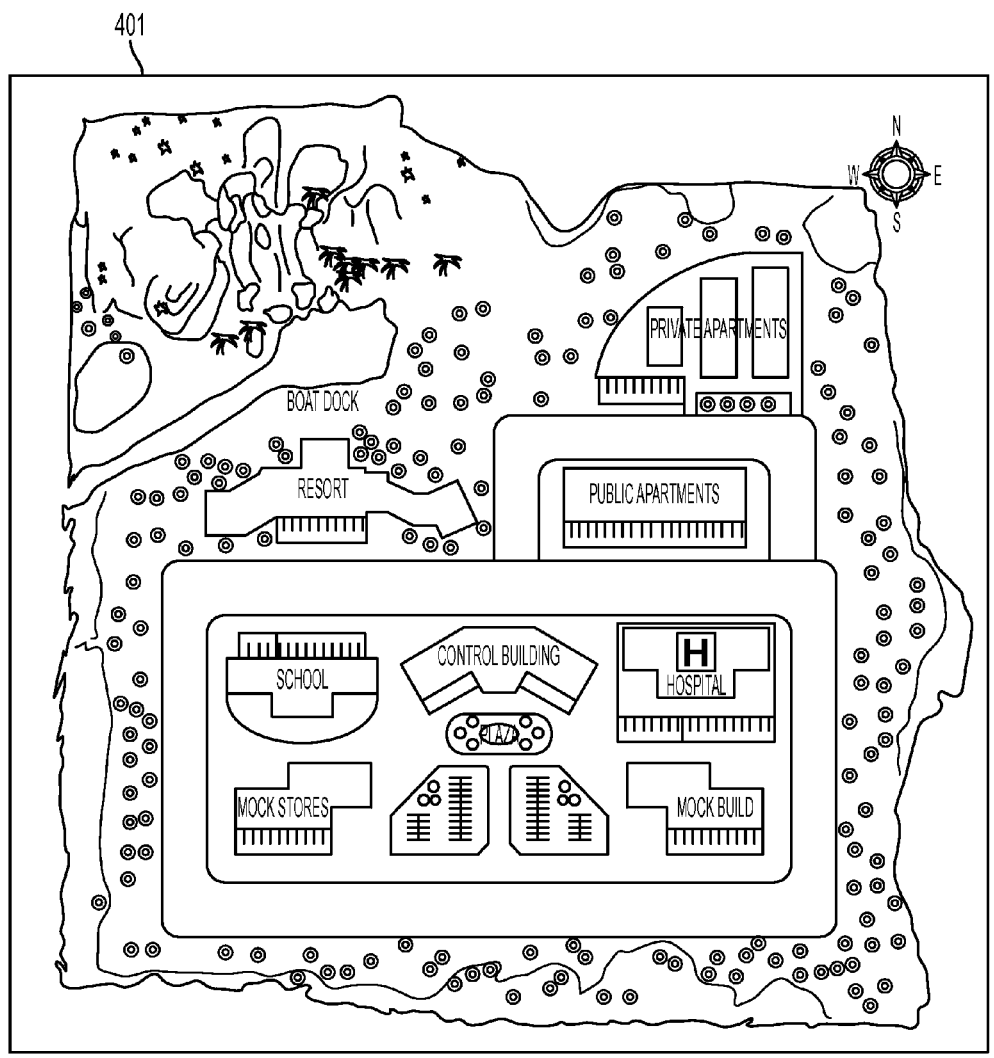
FIG. 4 is an exemplary virtual world plan view.

A modeled building allows avatars to move throughout and respond to visual indications and operate switches for control. FIG. 4 shows building locations 401 in the virtual world rendered relative to each other as in the real world.

Specialist avatars 205A, 205B, 205C, 205D, 205E (collectively 205) represent building specialists. Specialist users are personnel that manage building operation roles such as regulatory and safety 205A, equipment 205B, incident 205C, finance 205D, worker 205E, security and others. One specialist may combine one or more roles.

Workers are real world personnel responsible for performing real world building equipment maintenance and repair such as electricians, plumbers, HVAC technicians and others. Workers are also represented as avatars (step 505).

Avatars can move about, talk with each other and manipulate objects. Specialist users login to the virtual building operations center 201 and control specialist avatars 205 in the virtual environment. Using a computing device 103, specialist users view a virtual scene that is in their specialist avatar's Field Of View (FOV) and use a Human Interface Device (HID) to move their specialist avatar 205 about the virtual world. The HID allows a user to click, drag and manipulate objects by their avatar. An avatar FOV may be a first person view or a third person view. In the virtual world, an avatar moves normally by walking, or can teleport directly to another location, such as the virtual world building involved in a special condition activity.

Teleportation can be accomplished with proper authority if the virtual world allows teleportation. If a worker avatar requires teleportation, a specialist avatar 205 must explain the required steps verbally in the virtual world and guide the worker avatar to enter the commands to effect teleportation. When a specialist avatar 205 initiates the steps, the worker avatar appears in the desired location and the worker avatar's FOV is of that location.

When a specialist user manipulates an object in his specialist avatar's 205 FOV, the object may have embedded attributes pertaining to that virtual scene. For example, a fan in a cooling vent may respond to an HID click by having a text message pop-up near the fan that explains functional characteristics of the fan. Virtual world buildings 203 and avatars are shown at a level of detail appropriate for the application.

Avatars can use social tools such as blogs, mashups and wikis that are linked to specific situations and objects and tasks and workers or roles. The social tools can be displayed and accessed interactively in the virtual world. An avatar may access a web page for viewing information, or a version of the external tool's interface for interactive input. Such user-supplied and shared task data may include text, drawings, audio recordings, videos, dynamic 3D models and virtual world machinimas added to shared databases with tags that link to the particular details of the current task or discussion.

The fixtures and controls in the virtual building operations center 201 are constructed from primitives and textures to mimic the appearance of items in a real world operations center. The behaviors of the display and control devices are programmed using the script control language of the virtual world platform 111, with data stored in the virtual world data server 113, and in some cases using software coded commands supplied by the virtual world interface server 107 using computer instructions and specifications from the virtual world interface data server 109.

The virtual building operations center 201 is arranged as a conventional real world operation center format having one or more specialist avatar consoles 207A, 207B, 207C, 207D, 207E (collectively 207) with virtual computing devices 208A, 208B, 208C, 208D, 208E (collectively 208), one or more table 3D displays 209 and one or more vertical displays 211, 213, 215, 217, 219, 221, 223. Each specialist avatar console 207 corresponds with a specialist avatar's activity. The specialist avatar's virtual computing device 208 displays information pertaining to their specialties. For example, the display for a worker specialist avatar 205E may show real world worker activity and worker avatar activity. The vertical display 217, 219, 221, 223 nearest a specialist avatar's console may show data for that specialist avatar (step 507).

The table 3D display 209 shows one or more virtual world models of real world buildings and objects arranged in their relative real world locations (FIG. 4). The virtual world buildings and objects are rendered in several scale sizes to convey at a glance a bigger picture of scenes and situations and to highlight objects of special interest such as the location of worker avatars as they move about the real world. For situations such as fire emergencies, special alerts and displays can be presented visually including personalized auditory alarms.

The vertical displays 211, 213, 215 show common views such as real world security camera views and building layouts. Near a specialist avatar's console 207, a vertical wall display 217, 219, 221, 223 may show information specific to that specialist avatar as it pertains to a worker's task. A specialist avatar 205 may be allowed to change the vertical wall display as the work activity progresses in the area of their responsibility. Some vertical displays 211, 213, 215 display information and views in the virtual world or real world in a static manner while other displays such as security camera views of real world sites may be dynamic.

The virtual building operations center 201 forwards data from the virtual world server 111 to the virtual world interface server 107 and then on to the building control interfaces 119 which interrogate the real world building control systems (step 509).

Building control systems that employ a Distributed Control System (DCS), a Programmable Logic Controller (PLC), Siemens Apogee building management system, or other addressable components are interrogated by the building control interfaces 119. Data from a building control system may represent a disparate change in equipment status such as a heating unit failure, a switch position, an abnormal parameter or other indication.

The data is saved by the virtual world interface data server 109 and is forwarded to the virtual world interface server 107 for display. Within the virtual world, the information can be formatted to appear on a specialist avatar's console 207 or on their computing device 208 display, or shown on a nearby vertical display 217, 219, 221, 223, or used to change the visual appearance of an item in the specialist's avatar FOV such as producing a small desktop 3D model of the affected building with one of its floors glowing red to indicate overheating. The production of the visual data and the models is performed by linking external data from the virtual world interface server 107 and using this data within software scripts in the virtual world platform 111 that controls the presence and appearance of virtual objects.

The virtual world code is interpreted by the virtual world platform 111 using data available from the virtual world applications server 115 and in some cases from the virtual world interface server 107 to produce the different displays in the virtual operations center 201. The virtual building operations center 201 display content is coordinated to support how a situation should be portrayed and which specialist avatar should view the data based on real world building operations center experience.

The vertical displays 211, 213, 215 and virtual computing devices 208 can be supplied with appropriate external multimedia streams from the application server 115 as managed by the virtual world interface server 107 such as television news or Internet Real Simple Syndication (RSS) data feeds. This content may be called up by a specialist avatar 205. The vertical displays 211, 213, 215 can be supplied with data from external applications such as from word processing applications, spreadsheets, CAD or mapping applications, as well as information from various building control interfaces 119.

Virtual world scenes may be displayed as a window on virtual computing devices 208, and in certain situations this virtual world window may be supplemented by a separate standard application window on the same computing device that is not displayed within the virtual world but is still useful for the task at hand. The virtual world platform 111 is in this way augmented with traditional applications displayed side-by-side. The separate applications indirectly used include office or task application software and electronic communications such as email, instant messaging and social media with interactions logged.

The vertical displays 211, 213, 215 and virtual computing devices 208 can show periodic and event driven actions needed for buildings and equipment such as required maintenance on fire detection devices. Where the required actions have not been taken on time, annunciators ensure that there is compliance with the schedules and in order to show the condition that requires attention, a visual condition may be produced such as a throbbing glow on the virtual world device that needs attention and in some cases by a brief audible alert sound.

Pointer links 225 connect virtual objects that have a relationship in the virtual world operations center 201. Pointers 225 are temporarily visible lines in the virtual scene that glow with brightness portions that move along the line to attract the viewer's attention and guide a specialist avatar's line of sight to an important display item on a vertical display 211, 213, 215, 217, 219, 221, 223. Other related virtual objects can also be linked in this way, such as a miniature building on a specialist avatar's console 207C linked by a glowing pointer 225 to a wall display 211 that shows the photograph of a building or floor plan with equipment locations. A pointer 225 is produced by a given condition and object relationship or when a specialist avatar 205 chooses (touches or clicks) an object to get more linked information and fades away after a predefined time period.

Virtual world displays, models and other items can be highlighted and linked to other virtual world objects using pointers 225 in the virtual building operations center 201 or at a virtual world work site. A pointer can relate objects or features in an avatars' FOV. The relationships are maintained in the virtual world interface data server 109.

Objects with important conditions such as a building with an overly hot floor will have attributes and behaviors encoded such that the virtual world model of the object changes visually. For example, the outside of the virtual world building's second floor may glow red. This may be shown on the table display 209 as a glowing feature on one of the small models of that particular monitored building with the overheating condition. When the hot second floor is sensed by equipment in the building such as a digital thermometer and noted by a building control interface 119, the condition is shared with the virtual world interface server 107. The virtual world 111 is sent a signal by the interface software and a script in the small virtual model building on the table is activated to make that model have a red, throbbing floor. When the floor on that building model is touched by a specialist avatar, a pointer 225 is produced that points from that building model to a display 211 with visual information on the resort, such as the current equipment readings and work task suggestion.

Information on each specialist avatar 205 in building operations is entered into a database on the virtual world interface data server 109 that is used by the virtual world interface server 107 as it exchanges data and commands with the virtual world server 111 and its data server 113. Building and equipment information for operational control is entered into the database and is used to establish the behaviors of virtual world objects. Avatar 205 motions and building objects in the virtual world are linked for use in real-time monitoring and performance reviews and task activity improvements.

A copy of the virtual building operations center 201 and selected virtual buildings are constructed in the virtual world operations building (FIG. 4) near to the virtual building operation center 201 for training and familiarization with new equipment (step 511). The operations and logging are similar to that for the working version of the center, but with added code elements and procedures for generating situations for training and for recording and measuring performance metrics. Operations specialist avatars can walk from the virtual building operations center 201 to the training center to observe and help validate the training exercises. The virtual building operations center 201 also includes nearby rooms (not shown) for project planning, work evaluation and meetings.

The virtual building operations center 201 allows for remote real world building control via the network 105. The virtual building operations center 201 is used for activities undertaken in a real world building operations center that manages a plurality of buildings. Activities comprise monitoring safety and physical plant systems, coordinating the responses to emergencies, communicating with remote service personnel and scheduling necessary maintenance and regulatory compliance activities.

To enter the virtual building operations center 201 virtual environment, a specialist user using a computing device 103 logs in and is recognized (step 513). The specialist sees his specialist avatar's 205 FOV, and his specialist avatar is visible to the other specialist avatars 205 in the virtual building operations center 201. The other specialist avatar users are logged in from one or more remote locations. The specialist's avatar 205 can see the vertical displays 211, 213, 215 in the center that display incidents or scheduled work actions, a work list of today's activities and any news and communications from other specialists and workers (step 515). The avatars can communicate with each other by pointing and other gestures, and by voice using VOIP or text message chat as managed by the virtual world server 111.

Personalized views will be visible only to one or more selected specialist avatars involved with specific information such as in a Head-Up Display (HUD) that is managed by the virtual world interface server 107 and produced by the virtual world server 111 in the private FOV of that particular specialist. This aspect is similar to a real world user using their own laptop or pad computer or paper documents with their work assignments and data visible only to them, so they focus on their particular assignments and information without distracting or involving other specialists or workers.

A specialist avatar 205 may enter commands to monitor or control building equipment. When a virtual building operations center 201 display or building model is touched by a specialist avatar 205, text and instructions can be entered using the specialist's user computing device 103, with the input shown on a display device in the virtual world.

A specialist avatar 205 touches an object to issue a command and to retrieve information. The corresponding specialist user can also type in commands from their computing device 103, with these commands displayed on one or more of the virtual screens 211, 213, 215, 217, 219, 221, 223 by the virtual world server 111 using inputs from the virtual world interface server 107. The commands can include instructions and data for remote devices that are sent from the virtual world server 111 through the virtual world interface server 107 to a real world building command system 119 such as Siemens Apogee. Or, there can be an instruction to the virtual world server 111 to portray the scene in the virtual world where a worker avatar is attending to a task. The virtual world server 111 copies the display view from a virtual work site for display in the operations center 201. If a photo or video from the real world work site is available, having been copied to the virtual world interface server 107 and its data server 109, the image may be forwarded by the virtual world server 111 to a virtual building operations center 201 display 211, 213, 215, 217, 219, 221, 223 (step 517).

In response to a specialist command, the virtual building operations center 201 forwards data to a building's control system via a specific building control interface 119 which interprets and executes the commands. The building control system interfaces 119 and the virtual world interface server 107 log outgoing data.

A situation arises that requires action is coordinated by the virtual building operations center 201. The virtual world interface server 107 and specialist avatars 205 cooperate to determine the appropriate information and models to display by the virtual world server 111 as well as any visual indicators for status and action. The virtual world interface server 107 and specialist avatars 205 evaluate the special condition using display status 211, 213, 215, 217, 219, 221, 223 and log information from the virtual world interface server 107 and determine the commands and response personnel to remedy the condition.

Figure 6:
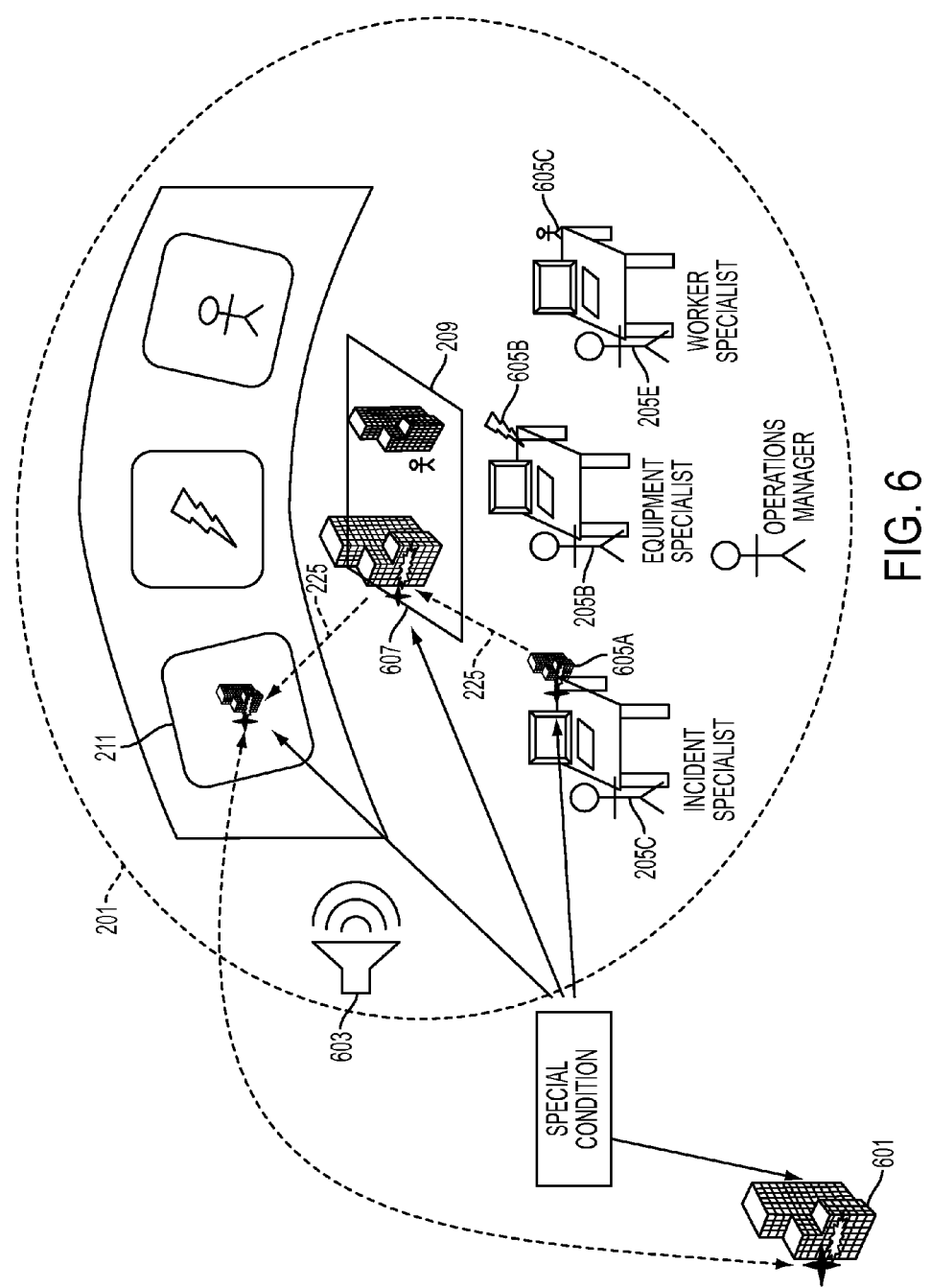
FIG. 6 is an exemplary virtual building operations center special condition alarm.
Figure 7:
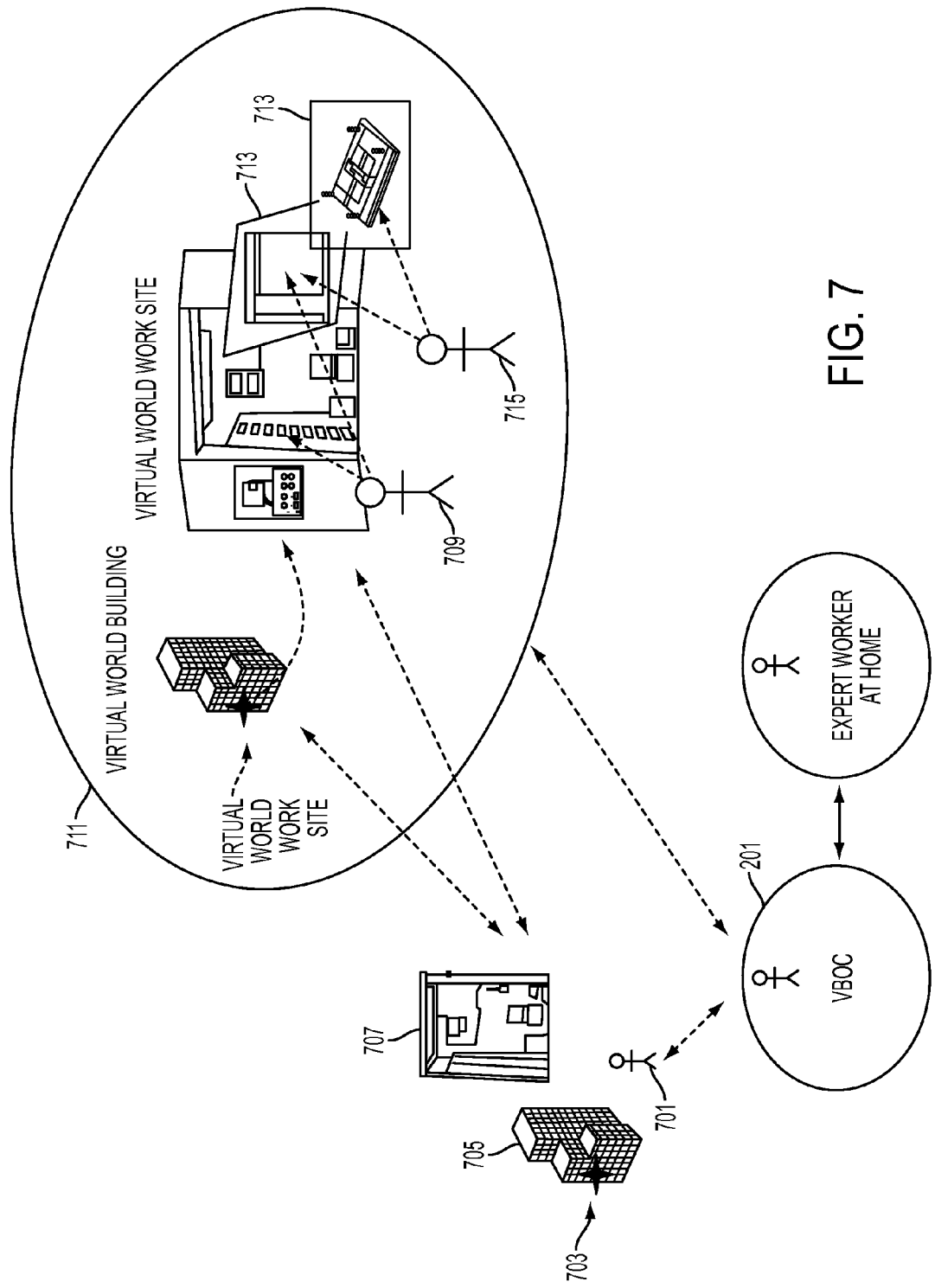
FIG. 7 is an exemplary real world worker/worker avatar correspondence.

FIG. 6 shows the virtual building operations center 201 responding to a building special condition that requires attention such as maintenance or repair or emergency. FIG. 7 shows a worker 701 at a work site 703 at the real world building 705 affected by a special condition. For each condition, embodiments bring into focus and display capabilities of the affected virtual environment. For a given condition, pointers 225 may connect scaled versions of the building and affected equipment.

An alarm 603 indicates attention or equipment failure and is accompanied by an enunciator in the virtual building operations center 201 (step 519) that can be seen or heard by a specialist user through their computing device 103. The enunciator may be in the form of a miniature 3D object 605A representing a real building component, an action in a concise visual form such as a power switch that needs to be turned-off 605B or an expert FIG. 605C who may be contacted for assistance appearing on the specialist avatars' consoles 205. A model of the building experiencing the problem also appears on the table 3D display 209 and vertical display 211.

Avatars may enter and negotiate virtual buildings for each monitored real world building. Smaller temporary models of buildings or objects like power switches or text information screens 713 may appear in the avatar's FOV in the virtual world work site 711 that is a copy of the real world work site 703, on a specialist avatar console 205 or on a worker's mobile computing device 103 to focus a specialist or worker avatar 205 on the special condition.

Data from real world building equipment is displayed in the virtual operations center on the vertical displays 211, 213, 215 or on the virtual computing devices 208 with selected information shown to a predetermined specialist avatar 205 who is trained to monitor the targeted information on their displays 217, 219, 221, 223 in the virtual building operations center 201 that are dedicated to the specialty for which they are responsible.

The equipment specialist avatar 205B is familiar with the real world building equipment and safety issues related to virtual world commands and task activities and can remotely turn off power for certain repairs or warn a worker of a sharp edge on a rotor blade that could be a hazard when reaching back into an assembly. The equipment specialist avatar 205B also enters commands to the real world building equipment in a manner that ensures efficiency and safety. For example, ensuring that the power is switched off for any high voltage equipment before repairs begin. Or, the specialist 205B can instruct a worker from within the virtual world by traveling to the virtual world work site 711, or over a mobile phone, on how to avoid a sharp edge or a hot surface.

The incident specialist avatar 205C silences the alarm 603 by pressing (touching) a button (step 521) on an alarm controller software display on their console 207C that is modeled after the real world building display used for this purpose. The alarm condition is also represented on the incident specialist avatar's console 207C desktop by a miniature 3D model 605A of the building 601 experiencing the problem with the alarm condition, for example an overheating fan. The overheating fan is indicated by a fan attribute such as glowing red 607 (step 523).

The equipment specialist avatar 205B views on their virtual computing device 208B a version of the software they would see on their real world display that controls remote equipment such as switch commands for power levels and important equipment information such as equipment identification and its repair history from a building control interface 119. In some instances, a miniature 3D model of the equipment 605B will appear on his console 207B by its object attributes or behaviors like an alarm.

The incident specialist avatar 205C reviews the condition and determines a course of action (step 525). The course of action may require one or more real world workers such as electricians or mechanics who may work independently or who may need to collaborate and communicate. The incident specialist avatar 205C collaborates with the equipment specialist avatar 205B on the remedy.

The equipment specialist avatar 205B may leave the virtual building operations center 201 and enter the virtual building experiencing the problem by walking or teleporting in the virtual world island 711 or may view the location of the virtual building where the problem is being experienced (step 527). The incident responses are coded in the virtual world interface server 107 that uses equipment states and its own data to recognize situations and produce response instructions for virtual world objects and data displays.

The coordination of specialists is supported by this coding such as changing the equipment data displays for the equipment specialist avatar 205B and at the same time producing a set of possible response (real world) workers for selection by the worker specialist avatar 205E who can contact a worker in the real world via telephony, email or instant message (step 529). Each specialist avatar 205 is presented at a minimum with displays that replicate a real world building operations center with commands and actions that an avatar can execute by typing in data after selecting a field or clicking a desired option. The importance of similarity to familiar real world software displays and interfaces is addressed by designing the virtual world response using the scripting and data exchange software and routines enacted by commands from the virtual world interface server 107.

As one or more workers travel to the building work site to perform maintenance, their progress may be followed on a 2D map or 3D model of the landscape and roadways in the virtual building operations center 201 on a specialist avatar's virtual computing device 208 or the table display 209 (step 531). The virtual operations center 201 can also record the positions, movements and actions of avatars for later review. Some avatars such as those for operations specialists 205 exist in the virtual building operations center 201 and worker avatars 709 exist in virtual buildings 711. Workers may be tracked by GPS, mobile phone position, radio triangulation or by verbal reports, any of which locators can be managed by the virtual world interface server 107. The patterns of activity can later be used to improve task accomplishment.

The worker may respond by logging into the virtual operations center 201 using a computing device 103 for the task assignment and retrieve information on the special condition (step 533). The worker specialist 205E then assists the worker in moving their avatar 709 from the operations center 201 to the work site 711 by walking or teleporting in the virtual world.

At the real world work site, the worker 701 can use a computing device 103 to see the virtual world work site 711 scene with added data displays of hazards or regulations 711, 713 (step 535). The worker 701 can communicate with the worker specialist avatar 205E (who is in the virtual building operations center 201) using a telephone or radio, or by VOIP or texting in the virtual world platform 111. The worker avatar 709 has an FOV of structures and equipment. The worker avatar 709 may bring into focus additional information about the equipment and structure by touching objects such as a wall, a switch, or a piece of equipment 713. The additional information may comprise a work flow, safety guidelines, visible dynamic attributes like throbbing or glowing that indicate abnormal operating conditions, 3D models of the structures and equipment with information on subparts anchored by temporary glowing pointers, exploded-view models for more detail, and prior repair history with notes supplied by previous workers. The worker can add to these notes if unusual conditions or hazards are encountered, to help later workers.

As the worker 701 performs maintenance at the work site, his physical motions (walking, touching) are captured in his worker avatar 709 in the virtual world work site 711 as detected from devices such as pedometers, gyroscopic acceleration detectors, or from camera views from security cameras. The worker specialist avatar 205E can manipulate the worker's avatar to match his physical motions (step 537) or the virtual world interface server 107 can use software to correlate the avatar motions to the real world movement inputs.

Worker avatar 709 actions correspond with worker 701 actions at the real world work site 703 scene. Real and virtual correspondence is maintained by software in the virtual interface server from position inputs from the real movements, or by independent means such as only changing the virtual scene when a signal from real equipment is received that validates that change or by a virtual operations center 201 worker specialist avatar 205E observing a camera view of the real world work site 703 scene and affirming a change before the virtual situation changes.

If a worker 701 reports a change such as changing a switch position for a piece of electrical equipment and that change is not seen or reported by other automated systems and/or personnel, this is a discrepancy between the real and virtual states. In this case, actions can be taken such as disabling the equipment remotely for safety purposes or redirecting the real world worker to make or check the change that they had reported so that the states agree. If an incorrect picture of the real situation is displayed in any real world screen or simulated 3D model such as an "off" switch position, then the specialist avatar 205 in that area will need to inform anyone affected and take steps to correct the view such as entering the virtual world interface software to correct or disable the incorrect view.

The worker 701 may supply information to the virtual building operations center 201 using telephony to forward a verbal message or a photograph 707 or by text message within the virtual world 111 (step 539). The virtual world interface server 107 sends the image or stream to the virtual world server 111 where it is displayed on one of the specialist avatar console 207 displays or a wall display 223 near the worker specialist avatar. The worker specialist avatar 205E can control the display 211, 213, 215, 217, 219, 221, 223 on which the work site 703 scene may be viewed. An audio feed from the work site 703 can be made available by the worker specialist avatar 205E to everyone in the virtual building operations center 201 or only to selected specialist avatars concerned with the work task. The audio that can be heard in the virtual world 111 by an avatar and sent to the virtual world interface server depends on the distance between the avatar and the virtual world source of the sound, being weaker with distance.

For the worker 701 at the real world work site 703 and his corresponding worker avatar 709 at the virtual world work site 711, items appear similar in form and layout except that in the virtual scene 711 the worker avatar 709 can touch or click on an object such as a piece of equipment to view a panel with information on the equipment 713 in the avatar's FOV. The information panel may bring into view a repair history or a miniature virtual model of the equipment (step 541).

If a second worker avatar or an expert worker avatar 715 is present at the virtual work site 711, the second worker avatar/ expert worker avatar 715 may or may not be authorized in the virtual world to view the same extra information 713 as the first worker avatar 709 can for reasons of job role or security.

If more than one worker avatar 709, 715 is at the virtual world work site 711, the worker avatars 709, 715 can communicate with each other using telephony in the real world (step 543). If one or both have computing devices 103 that can log in to the virtual building operations center 201, their avatars 709, 715 can communicate with each other and with the center 201 using VOIP or text messages. Similarly, any worker avatar can communicate using a telephone connection or virtual world text messages between the worker and the operations center specialist avatars 205.

Worker avatars 709, 715 are bound by predetermined security levels based on their clearance and work roles, such as restricting building area access to certain areas. Worker avatars 709, 715 are tracked by the virtual building operations center 201 and their motions and work activities are logged. The virtual building operations center 201 stores security and role information in the virtual world interface server 107, the applications server 115, or both depending on the way access is handled for a given set of buildings.

Information on work being performed by one worker avatar 709 may be supplied to another worker avatar 715 in the event that their activities need to be coordinated for a given task. The communications between avatars and any dependencies between their actions is managed by the worker specialist avatar 205E who communicates with them and in some cases controls their avatar. For example, working on electrical equipment may only be allowed if the expert avatar 715 in circuits gives his approval first. Task-related information displays 211, 213, 215, 217, 219, 221, 223 and object motion dependencies in real world situations as processed by the virtual interface server 107 may be used in the virtual world to provide added information to workers on possible actions and consequences.

The expert worker avatar 715 can be a remote journeyman with scarce skillsets or an experienced retiree who logs in to see the virtual work site 711 scene and any equipment and controls that require service, as well as being able to see the worker avatar 709. The expert worker avatar 715 can talk to the worker avatar 709 and provide background information and guidance.

For complex and dangerous tasks and for newer workers, the objects in a virtual world work site 711 may supply on-demand information and warnings clearly shown to the worker avatar 709, or and to a virtual building operations 201 specialist avatar 205. The information displayed may include data pertinent to the current work task such as graphs and miniature 3D models to assist the worker in diagnostics and repair and hazards. Such added information regarding the task and equipment that is shown on the main virtual operations center screens 211, 213, 215, 217, 219, 221, 223 can be seen by all of the virtual building operations center 201 specialist avatars 205. The virtual building operations center 201 can be accessed by other authorized personnel such as expert workers in particular building operations, or by supervisory personnel who may have added experience in particular operations and hazards, for assisting in operations, observing worker performance, or improving work processes.

Task site multimedia data from devices such as security cameras and microphones, and from worker devices such as smart phone audiovisual feeds is received by the building control device interfaces 119 or the virtual world interface data server 109, managed by the virtual world interface data server 109 and sent to the virtual world interface server 107 to be displayed for viewing by specialist avatars 205 or by worker avatars 709, 715 at the virtual world work site 711.

Selected text and video information 713 related to equipment and tasks may be displayed at the virtual building work site 711 where the worker avatar 709 sees the work scene, so that the information is in the worker avatar's 709 FOV. The same extra task information may also be displayed on selected displays 211, 213, 215, 217, 219, 221, 223 for specialist avatars viewing from the virtual building operations center 201. The views of building work sites and extra information for the real world worker 701 at the real world work site 703 and the worker specialist avatar 205E in the virtual building operations center 201 are managed by the virtual world interface server 107 so that they agree in information content.

Pictures and videos are taken over time of the real world buildings and repair activities, and the images are indexed and stored in databases 113, 109, 117 for display in the virtual building operations center 201 when required. To promote efficient work task resolution and rapid recognition, visual displays are shown as opposed to text 713 whenever practicable, displayed in a context and in a sequence that illustrates the resolution steps in an easy to understand way. For example, a cooling unit compressor may have certain connectors that should be unfastened in a predefined order to protect an internal part. The disassembly may be shown as a 3D step-by-step procedure using a model as opposed to reading a written description from a service manual.

Some worker avatar actions are repeated and may be modeled to produce standard best-practice sequences. For example, software routines in the virtual world can use these common occurrences to guide the hand-over-hand motions of the worker avatar in ascending a ladder or disassembling a motor unit. Depicting the actual positions and motions of a worker avatar in the virtual world can be valuable for viewing by later workers where it is important to visualize hazards, or for sharing some hard-learned better methods to move in cramped spaces. The steps taken in performing such standardized tasks are stored as structured stepwise models and are reviewed over time for efficiency and safety. Worker avatar actions are recorded in logs and may be combined later with task model information and other user inputs to improve the usability of the simulations as well as to address issues that may arise regarding the ergonomics of virtual world use in real world tasks.

Information from the real world work site 703 may be displayed in the virtual building operations center 201 with selected information shown to a financial specialist avatar 205D that is familiar with equipment costs, personnel actions and estimated lost revenues. The financial specialist avatar 205D communicates within the virtual world platform 111 using voice or text and advises the specialist avatars 205 in the virtual building operations center 201 regarding costs and risks of various response choices.

Information from regulatory and sustainability concerns may be displayed in the virtual building operations center 201 with selected information shown to a regulation-green specialist avatar 205A that is familiar with regulations and sustainability goals. The regulation-green specialist avatar 205A advises personnel regarding choices and consequences of actions in the regulatory areas and in sustainability or energy efficiency.

If the worker 701 does not have a computing device 103, the worker specialist avatar 205E can use telephony and can relay information verbally or by text while the worker is performing a repair (steps 545, 547). The worker 701 sees the real work site 703 without information available visually to the equipment specialist avatar 205B. In the case where there are no communications possible from a work site 703 and the virtual building operations center 201, then any virtual world simulation of the activity will be speculative and will need to be confirmed for actions and outcomes once the worker 701 once they can again communicate with the center 201 (step 549).

When a task such as a repair is completed, the worker 701 can log out (if logged in) of the virtual environment 111 or the worker specialist avatar 205E can log out the worker's avatar 709 and close out a work order so it can be stored in the virtual world interface data server 109 or stored to the application data server 117 for later use in task analysis and work improvement (step 551). The data captured by the virtual world interface server 107 or the application server 115 during work execution includes starting, ending, and elapsed times, the locations of the workers, the questions asked and answered between workers and specialist avatars 205 and the success of the work (step 553).

Responses to special conditions and ordinary maintenance operations such as maintenance or security observation when monitoring and controlling building operations are modeled, including the specialist avatars 205 and workers involved, the steps undertaken in that activity and the logged measurements of completion time and work quality (step 555). Information on task performance is recorded as activities in the real world that are matched by corresponding activities in the virtual world, either by direct inputs from tracked items such as tools used or buttons pushed, or as incrementally updated in the virtual scene by specialist and worker users interacting with the virtual world objects.

Specialist avatars 205, worker avatars 709, 715 and real world workers 701 are observed and interviewed by virtual building operations center 201 personnel such as the incident specialist avatar 205C or the worker avatar 205E after a work order has been completed to determine how they understood the work situation including the virtual scene and other sensory cues such as sounds or motor vibrations. The interviews determine information that can be supplied during a next similar work order to improve efficiency and quality (step 557).

When required task steps and worker or object interactions are known in advance, the virtual world interface server 107 executes routines that retrieve dependencies and retrieve approved workflow steps, diagrams and models needed by workers, and also that retrieve reminders for workers of important steps that must be performed. Embodiments use the virtual interface server to ensure that a given worker is informed of task step dependencies and the completion of the preceding task step by sending messages from other worker avatars for display on the given real world worker's computing device 103 (if equipped). If the sequenced steps or the communications are not taken, the appropriate specialist avatar 205 can see the remote situation and any dangers and can disable the power so that there are no injuries.

Part of data logging includes screen captures known as machinimas, which are dynamic movies of the virtual world work site, for later viewing by workers for training and performance analysis. Workers can watch previous work actions that used avatars for the same task, captured in the virtual world in order to study a preferred work approach. Machinimas may also assist in preventing injuries or in improving work efficiency (step 559).

One or more embodiments of the present invention have been described. Nevertheless, it will be understood that various modifications may be made without departing from the spirit and scope of the invention. Accordingly, other embodiments are within the scope of the following claims.

What is claimed is:

1. A method for maintaining real world buildings using a virtual world environment comprising:
    creating one or more virtual buildings each corresponding with a real world building, each virtual building comprises:
        an exterior;
        an interior;
        exterior and interior building equipment; and
        embedded building attributes; and
    creating a Virtual Building Operations Center (VBOC) to manage the one or more virtual buildings, the VBOC comprises:
        one or more specialist avatar consoles, each specialist avatar console corresponds with a specialist avatar activity and has a virtual computing device displaying information pertaining to the specialist avatars' activity;
        one or more table 3D displays; and
        one or more vertical displays; and
    interfacing each of the one or more virtual buildings with their real world building and the VBOC;
    creating a worker specialist avatar controlled to manage coordination of worker avatars and expert worker avatars according to a predefined responsibility, the worker specialist, expert worker and worker avatars have a first person or a third person Field of View (FOV), can walk or teleport to destinations, talk with other specialist or worker avatars and manipulate objects;
    and
    responding to a special condition for the one or more real world buildings from the VBOC; comprising:
        using a computing device, logging a real world worker responsible for performing real world building maintenance into the VBOC as a worker avatar, including rendering the worker avatar to capture physical motions of the real world worker, and presenting to the real world worker a work assignment pertaining to the special condition;
        using a computing device, logging a real world expert worker responsible for providing expertise to the real world worker into the VBOC as an expert worker avatar including rendering the expert worker avatar to capture physical motions of the real world expert worker, and presenting to the real world expert worker the work assignment pertaining to the special condition;
        teleporting the worker avatar and the expert worker avatar from the VBOC to a virtual world work site corresponding to a real world building work site experiencing the special condition;
        capturing the physical motions of the real world worker at the real world work site using sensors;
        detecting changes to the real world work site based on signals from real equipment at the real world work site;
        causing worker avatar motions according to the physical motions of the real world worker, and causing changes to the virtual world work site according to the changes to the real world work site; and
        providing guidance from the worker specialist avatar and from the expert worker avatar to the real world worker for performing the work assignment, the guidance being based at least in part on the worker avatar motions and the changes to the virtual world work site.

2. The method according to claim 1 wherein the specialist and worker avatars move throughout the VBOC and the one or more virtual buildings and respond to visual indications in the VBOC and the one or more virtual buildings.

3. The method according to claim 1 wherein the specialist avatars predefined responsibilities are regulatory and safety, equipment, incident, finance, worker and security.

4. The method according to claim 3 wherein the worker avatar mimics one of electrical, plumbing, HVAC and security workers.

5. The method according to claim 1 wherein interfacing the one or more virtual buildings with their real world building further comprises interrogating the one or more real world building control systems.

6. The method according to claim 1 wherein the one or more vertical displays further comprises displaying information from the one or more real world building control systems, external multimedia streams and data from external applications.

7. The method according to claim 1 wherein the one or more vertical displays further comprises displaying views from the one or more virtual buildings.

8. The method according to claim 1 wherein responding to one or more real world building special conditions further comprises connecting virtual objects that have a relationship with one or more pointers in the VBOC or in the one or more virtual buildings.

9. The method according to claim 8 wherein the pointers are visible lines in a specialist avatar's or worker avatar's FOV.

10. The method according to claim 9 further comprising linking the pointers to related virtual objects or to views of real world objects displayed on the one or more vertical displays, table 3D displays or virtual computing device displays.

11. The method according to claim 1 wherein interfacing the one or more virtual buildings with their real world buildings further comprises imbuing the one or more virtual world buildings with operational and informational attributes and behaviors so that the one or more virtual world buildings visually change when affected by a special condition.

12. The method according to claim 11 wherein a visual change reflects an abnormal building condition and/or includes explanatory text.

13. The method according to claim 1 wherein specialist or worker avatars further comprise touching a virtual world object to issue a command or to retrieve information.

14. The method according to claim 4 further comprising receiving in the VBOC a visual and audible special condition alarm from a virtual building requiring attention.

15. The method according to claim 14 wherein the alarm is a 3D object representing a corresponding real world building component accompanied by a scale model of the virtual building experiencing the problem.

16. The method according to claim 15 wherein the virtual building scale model appears on the one or more table 3D displays.

17. The method according to claim 16 further comprising:
acknowledging the special condition alarm by an incident specialist avatar using its virtual computing device to silence the audible alarm; and
displaying where the special condition has occurred on the virtual building scale model on the incident specialist avatar's console.

18. The method according to claim 17 further comprising:
examining equipment responsible for the special condition by an equipment specialist avatar using its virtual computing device; and
reviewing the special condition and determining a course of action by the incident specialist avatar wherein the course of action may require one or more real world workers.

19. The method according to claim 18 wherein to determine a course of action further comprises leaving the VBOC and entering the virtual building experiencing the special condition by the equipment specialist avatar walking or teleporting.

20. The method according to 19 further comprising selecting one or more real world workers by the worker specialist avatar and contacting the selected one or more real world workers via telephony, email or instant message.

21. The method according to claim 20 further comprising tracking the one or more real world workers as they travel to the real world building work site experiencing the special condition on a 2D map or 3D map displayed on the worker specialist avatar's virtual computing device or on the one or more table 3D displays.

22. The method according to claim 21 wherein the one or more real world workers are tracked by GPS, mobile phone position, radio triangulation or by verbal reports.

23. The method according to claim 22 further comprising:
using a computing device at the real world work site, viewing a first worker avatar's work site FOV of structures and equipment with data displays of hazards or regulations; and
having the first worker avatar touch objects to bring into view additional information.

24. The method according to claim 23 wherein the additional information includes work flows, safety guidelines, visible dynamic attributes that indicate abnormal operating conditions, 3D models of the structures and equipment, exploded-view models, and repair history.

25. The method according to claim 23 wherein capturing the physical motions of the real world worker at the real world work site comprises detecting the motions from pedometers, gyroscopic acceleration detectors, or the worker specialist avatar manipulating the one or more worker avatars to match their physical motions.

26. The method according to claim 25 further comprising:
supplying information from the real world worker to the equipment specialist avatar using telephony for verbal messages, photographs or text messages; and
displaying the real world worker information on the worker specialist avatar's virtual computing device or on the one or more vertical displays.

27. The method according to claim 1 wherein for the real world worker at the real world work site and the worker avatar at the virtual work site, objects appear similar in form and layout except at the virtual work site the worker avatar can touch or manipulate an object to view information.

28. The method according to claim 23 wherein if a second worker avatar or expert worker avatar is present at the virtual work site, the second worker avatar or expert worker avatar may or may not be authorized to view the same information as the first worker avatar due to job role.

29. The method according to claim 23 wherein if a second worker avatar is present at the virtual work site, the first and second worker avatars can communicate with each other using telephony, VOIP or text messages.

30. The method according to claim 26 wherein information from the real world work site is displayed in the VBOC with selected information shown to a financial specialist avatar that is familiar with equipment costs, personnel actions and estimated lost revenues.

31. The method according to claim 26 wherein information from the real world work site is displayed in the VBOC with selected information shown to a regulation-green specialist avatar that is familiar with regulations and sustainability goals.

32. The method according to claim 25 further comprising modeling the worker avatar's actions to produce best-practice sequences.

33. The method according to claim 25 further comprising after the real world work site work is completed, closing out a work order and storing the worker avatar's work sequences in the form of data on avatar and worker motions, voice and video recordings, 3D machinima recordings and annotations for later analysis.

34. The method according to claim 1 further comprising controlling the one or more real world building operations from the VBOC.

* * * * *